Oct. 24, 1933.  W. D. FERRIS  1,931,651
ANTIFRICTION BEARING CONNECTION FOR COIL SPRINGS
Filed April 4, 1932
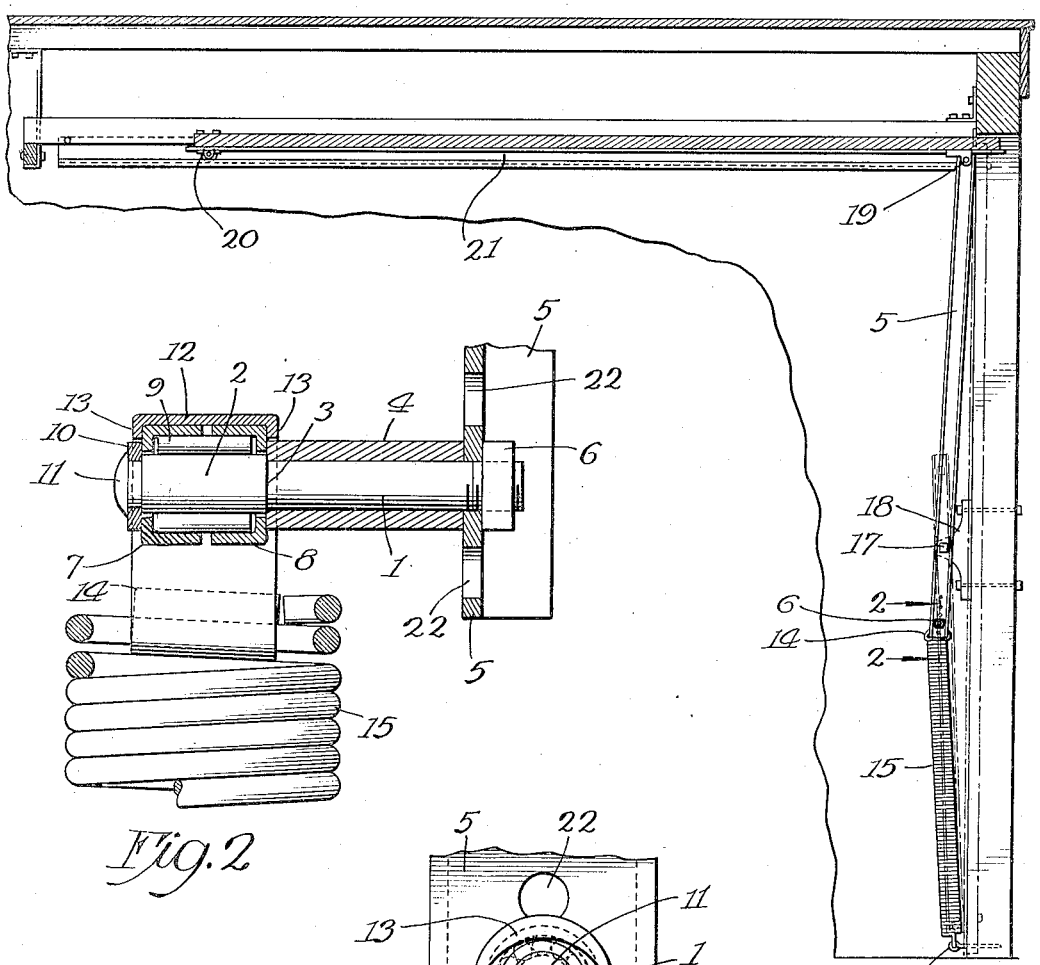

Patented Oct. 24, 1933

1,931,651

UNITED STATES PATENT OFFICE 1,931,651

ANTIFRICTION BEARING CONNECTION FOR COIL SPRINGS

William D. Ferris, Sterling, Ill., assignor to Frantz Manufacturing Co., Sterling, Ill., a corporation of Illinois Application April 4, 1932. Serial No. 602,933

7 Claims. (Cl. 267—1)

This invention relates to swivels for the ends of controlling springs, and more particularly to springs of this kind that are used on overhead garage doors, by which is meant doors of the kind that open upwardly and into an overhead position.

Generally stated, the object of the invention is to provide a novel and improved swivel construction whereby the end of the controlling spring will have a practically frictionless and at the same time a very secure connection with the element which is controlled by the spring.

It is also an object to provide certain details and features of construction and combinations tending to increase the general efficiency and the desirability of a spring connection of this particular character.

To the foregoing and other useful ends, the invention consists in matters hereinafter set forth and claimed and shown in the accompanying drawing, in which—

Fig. 1 is a vertical section of a portion of a garage building having an overhead opening door provided with springs and connections therefor embodying the principles of the invention.

Fig. 2 is a detail section on line 2—2 in Fig. 1 of the drawing.

Fig. 3 is a side elevation of the parts shown in Fig. 2 of the drawing.

Fig. 4 is a side elevation of a portion of the device, showing another form thereof.

As thus illustrated, the invention comprises a stud in the form of a bolt 1, having an enlarged cylindrical portion 2, forming a shoulder 3, with one end of the sleeve 4 bearing against this shoulder, and the other end of the sleeve bearing against the arm or lever 5, when the nut 6 on the bolt is screwed tightly into place. The two cups or shells 7 and 8 are placed in position against the rollers 9, which latter roll on the surface of the cylindrical enlargement 2 of the bolt. A washer 10 is placed against the outer shell 7, and the end of the bolt is then riveted over at 11, whereby the rollers and their raceway shells and the retaining washer are held against removal.

A saddle in the form of a metal strap 12, having its upper portion provided with down-turned flanges 13, has its lower ends provided with hooks or eyes 14 to receive opposite side portions of the spring 15, in the manner shown more clearly in Fig. 3 of the drawing. The flanges 13 embrace the raceway shells 7 and 8, as shown more clearly in Fig. 2 of the drawing, and in this way the pull of the spring is exerted on the top of the roller bearing, by the saddle 12, and the latter is not liable to slip off, being held in place by the flanges 13, previously mentioned.

The roller bearing thus formed is held against axial displacement in one direction by the end of the sleeve 4, and in the other direction by the washer 10, and with this construction the connection from the spring to the arm or lever is practically of a frictionless character.

In use, as for example on a garage door of the kind shown in Fig. 1, the lower end of the spring is preferably secured at 16 to one side of the doorway. Also, the arm or lever 5 is preferably pivoted at 17 to the bracket 18, secured to the doorway. The other end of the arm or lever is pivoted at 19 on the lower end portion of the door. It will be understood that there are two springs, and two levers, one at each side of the doorway. The upper end of the doorway is provided with rollers 20, which travel on the horizontal overhead tracks 21, that extend inwardly from the top of the doorway. When the door is in open position, as shown in Fig. 1, the spring is practically on center, so to speak, and tends, in the opening movement of the door, to gently slow the door into open position, so that it will not open with a shock. If the door opens a little farther, the shorter ends of the lever 5 will strike the sides of the doorway and thus provide a positive stop to limit the opening movement of the door. When the door is pulled down into closed position, the springs 15 yieldingly resist this closing movement and cushion the final closing movement of the door, at which time the springs are again practically on center, or perhaps just a little over the center, so that they are at such time holding the door in closed position. See the dotted lines in Fig. 1 of the drawing, indicating the position of the arms or levers 5 when the door is in closed position.

During such opening and closing movements of the door, it will be seen that the springs swing relatively to their allotted arms or levers, easily, and practically without friction, because of the inter-position of the roller bearings between the springs and the arms or levers to which they are connected, and over which they exert their control, thereby to in turn exercise spring control over the door, thereby to assist in opening the door, and to cushion the closing movement of the door. The roller bearing connections thus provided between the springs and the arms or levers are strong and substantial, and are not liable to break or get out of order, and contribute very materially to the easy opening or closing movements of the door.

However, it will be understood that the roller bearing spring connection thus shown and described may be used in other situations, or for other purposes, or in different ways on other doors.

By reason of the series of holes 12 in the arm or lever 5, it is obvious that the stud 1 can be adjusted from one position to another on said arm or lever, thereby to change the tension of the spring, which latter is preferably a coil spring of suitable size and made of suitable spring steel.

As shown in Fig. 4, which shows the preferred form of this device, the stud has an integral hexagonal portion 23, instead of the sleeve shown in the other figures, and this hexagonal portion terminates at opposite ends in reduced portions, one of which is screw-threaded to receive the retaining nut, and the other of which is cylindrical to receive the anti-friction rollers as shown in the other figures. But the hexagonal construction is probably somewhat stronger, and is preferred to the other.

What I claim as my invention is:

1. The combination of a member, a stud fastened to said member, an anti-friction bearing on the outer end portion of said stud, a coil spring, and a saddle for imposing the pull of the spring on said bearing, said bearing comprising rollers engaging the stud, and including a sectional outer shell engaging the rollers, said saddle engaging the shell.

2. The combination of a member, a stud fastened to said member, an anti-friction bearing on the outer end portion of said stud, a coil spring, and a saddle for imposing the pull of the spring on said bearing, said bearing comprising rollers engaging the stud, and including a sectional outer shell engaging the rollers, said saddle engaging the shell, said saddle having a top portion embracing the bearing, and having oppositely disposed lower ends engaging opposite sides of the end portion of the spring.

3. The combination of a member, a stud fastened to said member, an anti-friction bearing on the outer end portion of said stud, a coil spring, and a saddle for imposing the pull of the spring on said bearing, said stud comprising a bolt having a cylindrical enlargement at its outer end, and said bearing having rollers engaging said enlargement, with a washer on the outer end of the bolt, held thereon by riveting over the end of the bolt, and a sleeve on said bolt, clamped endwise between the inner shoulder of said enlargement and said member, serving to space the bearing from said member.

4. The combination of a member, a stud fastened to said member, an anti-friction bearing on the outer end portion of said stud, a coil spring, and a saddle for imposing the pull of the spring on said bearing, said stud being adjustable from one position to another on said member, thereby to change the tension of said spring.

5. The combination of a member, a stud fastened to said member, an anti-friction bearing on the outer end portion of said stud, a coil spring, and a saddle for imposing the pull of the spring on said bearing, said saddle having upper flanges embracing said bearing, and having lower ends engaging the opposite sides of the end coil of said spring.

6. The combination of a member, a stud fastened to said member, an anti-friction bearing on the outer end portion of said stud, a coil spring, and a saddle for imposing the pull of the spring on said bearing, said stud having an integral hexagonal body, with reduced end portions, one end portion being threaded to receive a retaining nut bearing against said member, and the outer reduced end portion having said anti-friction bearing thereon.

7. The combination of a member, a stud fastened to said member, an anti-friction bearing on the outer end portion of said stud, a coil spring, and a saddle for imposing the pull of the spring on said bearing, said stud comprising an integral body portion, with reduced end portions, one end portion being rigidly secured to said member, and the other end portion having said anti-friction bearing thereon.

WILLIAM D. FERRIS.